(12) United States Patent
Wang et al.

(10) Patent No.: US 10,558,539 B2
(45) Date of Patent: Feb. 11, 2020

(54) METHODS AND SYSTEMS FOR TESTING COMPONENTS OF PARALLEL COMPUTING DEVICES

(71) Applicant: GM GLOBAL TECHNOLOGY OPERATIONS LLC, Detroit, MI (US)

(72) Inventors: Shige Wang, Northville, MI (US); Gurmitsingh M. Banvait, Novi, MI (US); Sidharth Nakra, Farmington Hills, MI (US); Shane M. Boehner, Fenton, MI (US); Joseph G. D Ambrosio, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 15/719,102

(22) Filed: Sep. 28, 2017

(65) Prior Publication Data
US 2019/0095302 A1 Mar. 28, 2019

(51) Int. Cl.
*G06F 11/00* (2006.01)
*G06F 11/26* (2006.01)
*G06F 11/07* (2006.01)

(52) U.S. Cl.
CPC .......... *G06F 11/26* (2013.01); *G06F 11/0739* (2013.01)

(58) Field of Classification Search
CPC .. G06F 11/26; G06F 11/1608; G06F 11/1612; G06F 11/1629; G06F 11/0739; G06F 11/1666; B60W 50/04
See application file for complete search history.

(56) References Cited

U.S. PATENT DOCUMENTS

| | | | |
|---|---|---|---|
| 2009/0044044 A1* | 2/2009 | Harter | G06F 11/1407 714/6.23 |
| 2009/0055685 A1* | 2/2009 | Mochida | G05B 19/0428 714/30 |
| 2014/0343787 A1* | 11/2014 | Mabuchi | B60W 50/04 701/31.7 |
| 2018/0046531 A1* | 2/2018 | Harsch | G06F 11/1487 |

* cited by examiner

*Primary Examiner* — Joseph D Manoskey
(74) *Attorney, Agent, or Firm* — Lorenz & Kopf, LLP

(57) ABSTRACT

Systems and methods are provided for testing a first computer device of a vehicle. A method includes selecting an operational component of the first computer device and selecting a test operation that is configured to utilize an entire capacity of the operational component. The method further includes instructing the first computer device to perform the test operation and to generate a first result. The method further includes retrieving a second result of the test operation and comparing the first result of the test operation from the first computer device with the second result. The method further yet includes indicating that the first computer device is faulty based at least in part on a difference between the first result and the second result.

20 Claims, 3 Drawing Sheets

METHODS AND SYSTEMS FOR TESTING COMPONENTS OF PARALLEL COMPUTING DEVICES

TECHNICAL FIELD

The present disclosure generally relates to testing operational components of computer devices, and more particularly relates to systems and methods for instructing computer devices to execute a test operation and for indicating a fault when the result is not as expected.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle further uses information from global positioning systems (GPS) technology, navigation systems, vehicle-to-vehicle communication, vehicle-to-infrastructure technology, and/or drive-by-wire systems to navigate the vehicle.

Analyzing the data from the sensor devices requires substantial computing power. To meet the computational demand of vehicle automation, parallel processing devices have become more common in vehicle hardware. For example, Graphics Processing Units (GPUs) are utilized to take advantage of increased computational capacity for certain operations. Although these parallel processing devices may offer increased computational capacity, they do not typically have robust capability to test themselves for functional correctness.

Some complex devices have built-in self-test (BIST) capability. A BIST is executed within the device itself at boot-up to determine whether the device is faulty. BIST, however, offers no ability to run the test while the device is operating after boot-up, does not permit testing individual components to limit the performance impact of testing, and otherwise gives very little flexibility in testing the device or components of the device. Furthermore, parallel processing devices do not typically have BIST capability.

Accordingly, it is desirable to provide systems and methods that test individual components of a device while the device is operating. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for testing an operational component of a first computer device of a vehicle. In one embodiment, a method includes selecting the operational component of the first computer device and selecting a test operation that is configured to utilize an entire capacity of the operational component. The method further includes instructing the first computer device to perform the test operation and to generate a first result. The method further yet includes retrieving a second result of the test operation and comparing the first result of the test operation from the first computer device with the second result. The method further yet includes indicating that the first computer device is faulty based at least in part on a difference between the first result and the second result.

In one embodiment, a method of testing a first computer device of a vehicle includes selecting an operational component of the first computer device, where the operational component is one of a memory component, a register, or an Arithmetic Logic Unit (ALU). The method further includes selecting a test operation that is configured to utilize an entire capacity of the operational component, where selecting the test operation includes selecting a write operation and a read operation as the test operation in response to the operational component being the memory component. Selecting the test operation further includes selecting a bit shift operation as the test operation in response to the operational component being the register and selecting one of a vector addition operation, a vector multiplication operation, or a logic operation in response to the operational component being the ALU. The method further includes instructing the first computer device to perform the test operation and to generate a first result. The method further yet includes further includes instructing a second computer device of the vehicle to perform the test operation and generate a second result. The method further includes comparing the first result of the test operation from the first computer device with the second result based on a functional correctness of the first computer device. The method further yet includes indicating that the first computer device is faulty based at least in part on a difference between the first result and the second result.

In one embodiment, a system for testing a computer device of a vehicle includes at least one processor. The at least one processor is configured for selecting an operational component of the first computer device, selecting a test operation that is configured to utilize an entire capacity of the operational component, instructing the first computer device to perform the test operation and to generate a first result, retrieving a second result of the test operation, comparing the first result of the test operation from the first computer device with the second result, and indicating that the first computer device is faulty based at least in part on a difference between the first result and the second result.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
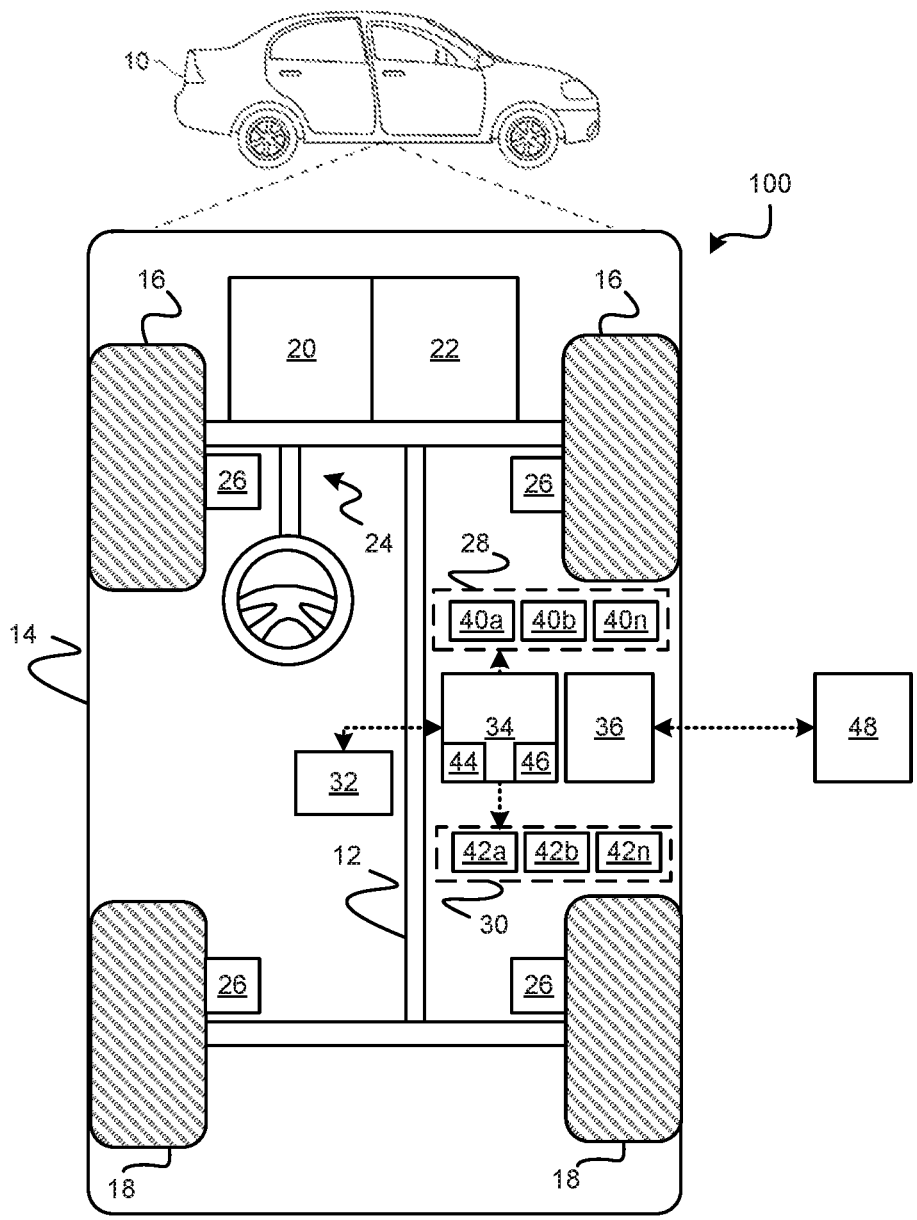
FIG. 1 is a functional block diagram illustrating an autonomous vehicle having a control system, in accordance with various embodiments.

With reference to FIG. 1, a control system shown generally at 100 is associated with a vehicle 10 in accordance with various embodiments. In general, control system 100 has architecture and runtime services to check the functional correctness of a parallel computing device during operation. Control system 100 utilizes a combination of diverse test cases and test invocations that are executed by a computer device of vehicle 10. The testing can be implemented with different configurations to meet different needs across different parallel computational hardware. The testing is reconfigurable at runtime and is capable of controlling interference to the normal computation of the computer device.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes multiple computer devices that each include at least one processor 44 and a computer readable storage device or media 46. The processor 44 can be any custom made or commercially available processor or generally any device for executing instructions. The computer readable storage device or media 46 may include volatile and nonvolatile storage in read-only memory (ROM), random-access memory (RAM), and keep-alive memory (KAM), for example. KAM is a persistent or nonvolatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 100 and, when executed by the processor 44, perform the methods described below.

Figure 2:
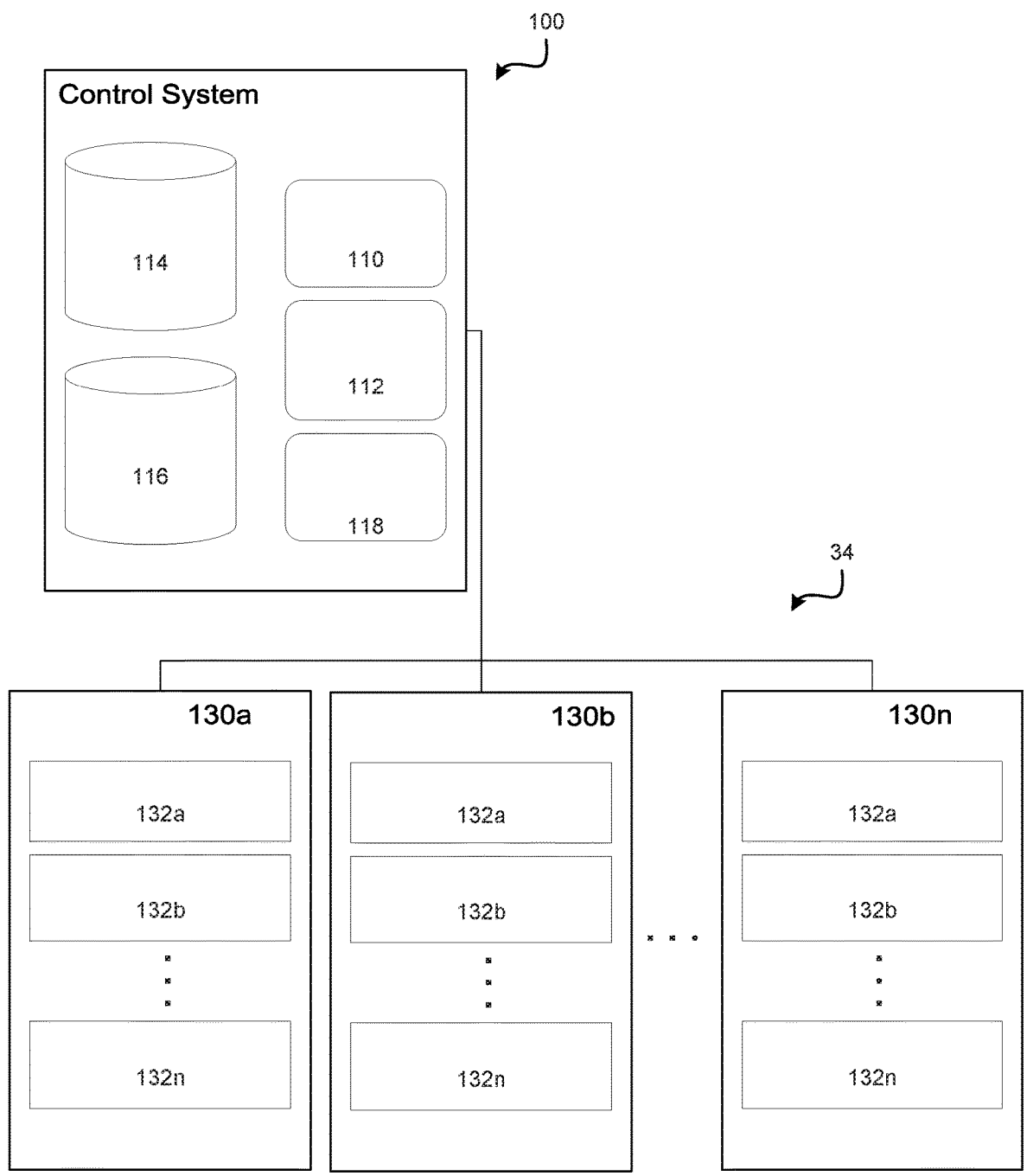
FIG. 2 is a simplified block diagram illustrating a control system of the autonomous vehicle, in accordance with various embodiments.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Referring now to FIG. 2, and with continued reference to FIG. 1, a simplified block diagram illustrates various embodiments of the control system 100 and controller 34. In the example provided, control system 100 is embedded within a device of the controller 34. Various embodiments of the control system 100 according to the present disclosure may include any number of sub-modules of the control system 100 and any number of devices of the controller 34. As can be appreciated, the sub-modules shown in FIG. 2 may be combined and/or further partitioned to similarly control the vehicle 10. Inputs to the control system 100 may be received from devices of controller 34, received from the sensor system 28, received from other control modules (not shown) associated with the vehicle 10, received from the communication network 56 at the communication system 36, and/or determined/modeled by other sub-modules (not shown) within the controller 34.

In various embodiments, control system 100 includes a test control module 110, a test case module 112, a preconfigured test database 114, precomputed test results 116, and a result comparison module 118. Control system 100 is configured to test a component of a device by performing the methods described below.

Controller 34 includes any number of computer devices 130a-n. A computer device, as defined herein, is computer hardware that includes multiple components (defined below) and is individually addressable by an operating system running on controller 34. In the example provided, the devices include central processing units (CPUs), graphics processing units (GPUs), a semiconductor based microprocessor (in the form of a microchip or chip set), a macroprocessor, and any combination thereof. The devices are individually addressable such that an operating system executing on controller 34 may selectively utilize or not utilize any particular computer device 130a-n for a computation.

Each of devices 130a-n includes operational components 132a-n. Each operational component, as defined herein, is one of an Arithmetic Logic Unit (ALU), a register, a memory component, and a cache. In the example provided, the individual components 132a-n are not individually addressable by the operating system executing on controller 34. For example, the operating system may not directly instruct first operational component 132a (e.g, a memory component) of first computer device 130a (e.g., a GPU) to operate. Instead, in the example provided, first computer device 130a is instructed to perform a test operation that utilizes first operational component 132a. For example, data may be sent to and retrieved from first computer device 130a to test first operational component 132a when first operational component 132a is a memory component.

Test control module 110 is configured for selecting an operational component of the first computer device and for instructing the first computer device to perform the test operation and generate a first result. In the example provided, first operational component 132a of first computer device 130a is selected as the operational component to be tested.

In some embodiments, test control module 110 performs tasks based on a request structure received by a software application running on controller 34. The request structure may be generated by a software application or by a predefined generation policy. In one example, a predefined policy is one of: testing components periodically in sequence, testing components periodically at random, and testing components that have utilization higher than 40%.

In one example, the request structure may have the form <type, comp, method, invoc>, where "type" is the type of test (e.g., stored or generated test cases), "comp" indicates the components or components to test, "method" indicates generation information (e.g., pattern selection, size, etc), "invoc" indicates the invocation control (e.g., idle, period, immediate, etc). By specifying a component to test, the test may be partitioned to reduce interference with normal operation of first computer device 130a. For example, first operational component 132a (e.g., a memory) may be tested separately from second operational component 132b (e.g., a register) to separate out the time required for testing second operational component 132b. Accordingly, a result for first operational component 132a may be computed faster than would be required to test all components of first computer device 130a. By specifying the invocation, the test operations may be performed using idle cycles ("slack") of first device 130a or may be performed on-demand to control the interference with normal operation of first computer device 130a. It should be appreciated that the request structure may have different forms without departing from the scope of the present disclosure.

In some embodiments, test control module 110 is configured for instructing a second computer device of the vehicle to perform the test operation. For example, when no precomputed test result is available for the test operation from precomputed test results 116, then test control module 110 may instruct another computer device (e.g., a CPU, a GPU, etc.) to perform the test operation. For example, test control module 110 may instruct second computer device 130b as a redundant device to perform the same test operation so that test results from first and second devices 130a-b may be compared. It should be appreciated that second computer device 130b may be the same type as first computer device (e.g., GPU and GPU) or may be different (e.g., GPU and CPU) without departing from the scope of the present disclosure.

Test control module 110 is further configured for selecting an invocation control that indicates execution timing for the test operation. For example, selecting the invocation control may include selecting one of an immediate execution, a periodic execution, and an idle cycle execution. In the example provided, the invocation policy is determined based on the request structure.

Test control module 110 may terminate a test in response to arrival of a new request or may generate a test operation to continue the current test. When a new request is received, the test may be generated based on the software application when the request structure indicates the test is an "on-demand" test. The test may also be generated based on device usage when the request structure does not indicate an "on-demand" test.

Test case module 112 is configured for selecting a test operation that is configured to utilize an entire capacity of the operational component. The term "entire capacity," as used herein, means each bit of a register, each allocation unit of memory or cache, each ALU of a processor, or each otherwise operable unit that may be used by the computer device.

Test case module 112 may construct a test or may retrieve a preconfigured test from preconfigured test database 114. When test case module 112 uses a preconfigured test and there is more than one suitable preconfigured test in preconfigured test database 114, test case module 112 may rotate through the preconfigured tests or may randomly select one of the preconfigured tests.

In one example, selecting the test operation includes selecting a write operation and a read operation as the test operation in response to the operational component being a memory component. In some examples, selecting the test operation includes selecting a bit shift operation as the test operation in response to the operational component being a register. In some examples, selecting the test operation includes selecting one of a vector addition operation, a vector multiplication operation, and a logic operation in response to the operational component being an Arithmetic Logic Unit (ALU).

In the example provided, test case module 112 selects a test case based on the received request structure. If the test type is "stored," test case module 112 selects a stored preconfigured test from preconfigured test database 114. If the test type is "runtime," then test case module 112 generates a test that utilizes the entire capacity of the component.

For example, the request structure <"store", "ALU", "full", add", "100 ms"> for a computer device with 128 ALU elements retrieves a preconfigured test case that uses a stored vector with a size of 128 operations (vect<128> a, b, a+b) every 100 ms. In another example, the request structure <"store", "register A", "0-4 bit, xor," "200 ms"> for a computer device with a 32-bit register will test bits 0-4 using an XOR operation every 200 ms. In yet another example, the request structure <"runtime", "ALU", "full, any", "on-demand"> for a computer device with 128 ALU elements yields a test case generated at runtime using a vector whose values are generated randomly and performs a mathematical operation selected from a predefined list (e.g., addition, multiplication, division, etc).

In order to generate a test, test case module 112 uses vector addition, multiplication, or logic operations (AND, XOR) for ALUs, uses bit shifts for registers, and uses read and write operations for memory. The size of test data is selected to cover all units in one round. For example, a 128 ALU component will be tested with 128-element vector operations. A 16 KB memory will be tested with 16 KB data. For example, the memory may be tested by altering between all "0" and "1" in different tests. In another example, a 16-bit register may be tested by 16 bit-shift operations.

When the computer component is not directly testable (e.g., cache, some registers, etc.), indirect tests may be generated using other tests. For example, a test that causes the computer device to read and write from a cache may be utilized to test the cache.

Preconfigured test database 114 is configured for storing tests that have been preconfigured to utilize the full capacity of the tested component. For example, a preconfigured test may specify multiplication of a specified 128-element vector as a preconfigured test operation for a 128 ALU component.

Precomputed test results 116 are configured for storing precomputed results of preconfigured tests. Accordingly, parallel computation of the test operation by second computer device 130b may be omitted in some implementations. In the example provided, an index uniquely identifies test cases and facilitates synchronizing receipt of the rest results.

Result comparison module 118 is configured for retrieving a second result of the test operation, comparing a first result of the test operation from the first computer device with the second result, and indicating that the first computer device is faulty based at least in part on a difference between the first result and the second result. For example, when a precomputed test result is available, retrieving the second result includes reading a pre-generated second result stored in precomputed test results 116. Conversely, when the second computer device executes the test operation, retrieving the second result includes retrieving a second test result from the second computer device.

In the example provided, comparing the first result with the second result is further based on a functional correctness of the first computer device. For example, the values of the test results are compared, rather than the timing of the computations. In the example provided, the results are compared based on predefined fault patterns. For example, when the pattern is pass/fail, the comparison will fail when the values of the test results are not equal. In some embodiments, the fault pattern may give diagnostic information. For example, if item "X" is not equal, then ALU "X" may be a faulty device.

Result comparison module 118 indicates that the first computer device 130a is faulty based on the comparison between expected and computed results. For example, result comparison module 118 may feed the fault indication to system software and/or applications for mitigation or recover actions.

In some embodiments, the application or system software may flag the fault and discontinue use of the first computer device 130a. For example, the application or system software may flag the whole device or the faulty component of the device and may resubmit the request structure to a different computer device. The application or system software may then discontinue use of first computer device 130a.

Figure 3:
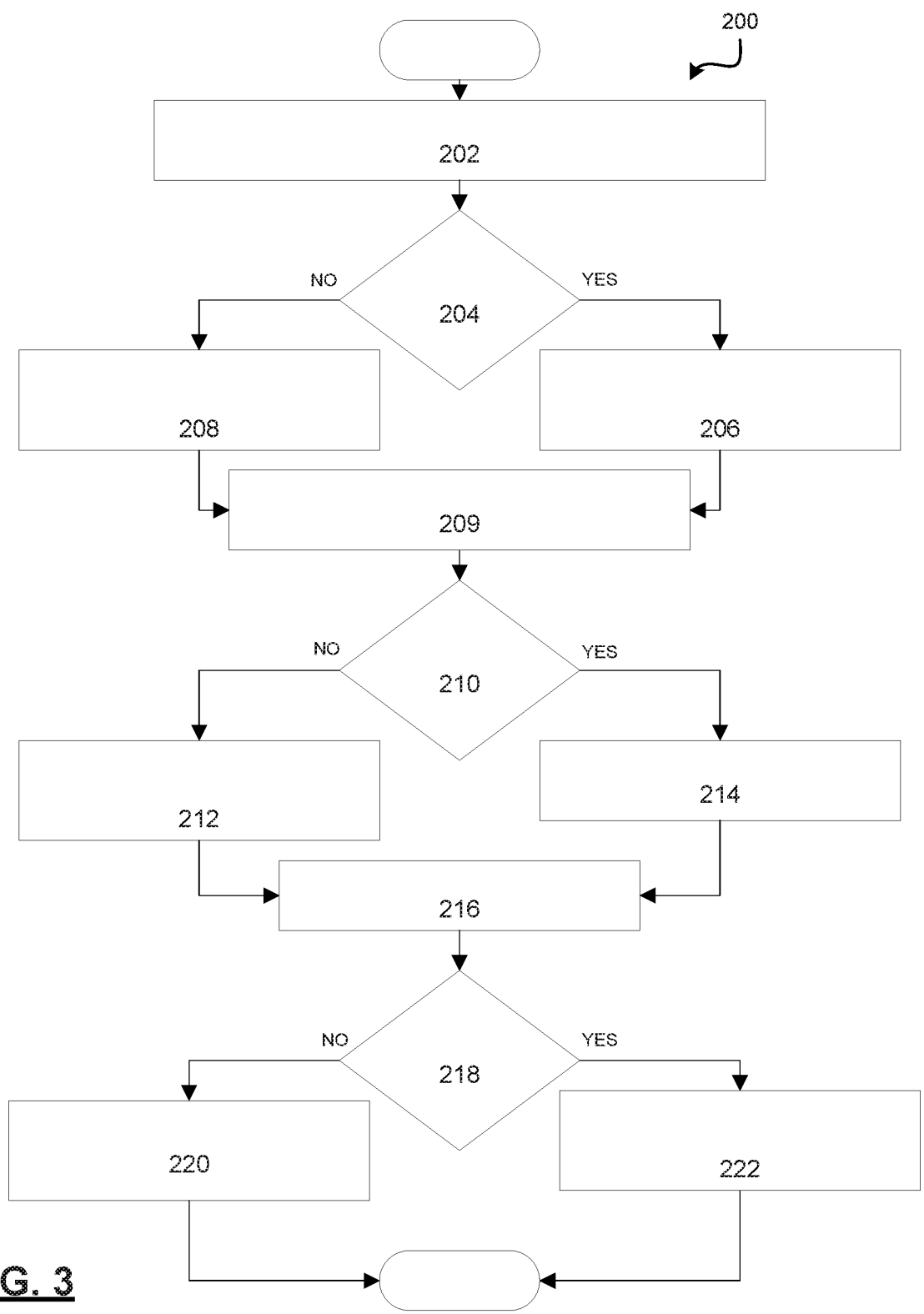
FIG. 3 is a flowchart illustrating a control method for testing components of the computer devices of FIG. 2, in accordance with various embodiments.

Referring now to FIG. 3, and with continued reference to FIGS. 1-2, a flowchart illustrates a control method 200 for testing an operational component of a computer device in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. In various embodiments, the method 200 may be scheduled to run based on one or more predetermined events, and/or can run continuously during operation of the vehicle 10.

Control system 100 selects a component of a first device to test in task 202. For example, the request structure may indicate that test control module 110 will test first operational component 132a of first computer device 130a.

Control system 100 determines whether to use a stored test in task 204. For example, test case module 112 may evaluate the request structure to determine whether to generate a new test case or to retrieve a preconfigured test from preconfigured test database 114. When control system 100 will use a stored test, method 200 proceeds to task 206. When control system 100 will not use a stored test, method 200 proceeds to task 208.

Control system 100 selects a preconfigured test for the operational component in task 206. For example, test case module 112 may retrieve a 128-element vector multiplication test when first operational component 132a of first computer device 130a is a 128-element ALU operational component. Control system 100 generates a test operation for the component in task 208. For example, test case module 112 may generate a 128-element vector multiplication test when first operational component 132a of first computer device 130a is a 128-element ALU operational component.

Control system 100 determines whether to use a stored result in task 210. For example, result comparison module 118 may determine whether a test result for the test operation exists in precomputed test results 116. When control system 100 will use a stored test result, method 200 proceeds to task 214. When control system 100 will not use a stored test result, method 200 proceeds to task 212.

Control system 100 instructs a second device to perform the test in task 212. For example, test control module 110 may instruct second operational component 132b to perform the test in task 212. Control system 100 retrieves the stored test result in task 214. For example, result comparison module 118 may retrieve a precomputed test result from precomputed test results 116.

Control system 100 compares the results to determine whether they are different in task 218. For example, result comparison module 118 may compare the values produced by the test operation on first computer device 130a and on second computer device 130b to indicate the functional correctness of first operational component 132a of first computer device 130a. When the results are different, method 200 proceeds to task 222. When the results are the same, method 200 proceeds to task 220.

Control system 100 indicates that the first device is not faulty in task 220. For example, result comparison module 118 may report to an application or system service that first operational component 132a of first computer device 130a is acceptable for further use. Control system 100 indicates that the first device may be faulty in task 222. For example, result comparison module 118 may indicate to the application or system service that first computer device should not be used in future computations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of testing a first computer device of a controller of a vehicle, the method comprising:
    selecting, at a program running in an operating system in the controller, an operational component of the first computer device that is not individually addressable by the operating system;
    selecting, at the program, a test operation that is configured to utilize an entire capacity of the operational component without directly addressing the operational component by the operating system;
    instructing the first computer device by individually addressing the first computer device to perform the test operation and to generate a first result while the operating system is executing on the controller;
    retrieving a second result of the test operation;
    comparing the first result of the test operation from the first computer device with the second result; and
    indicating that the first computer device is faulty based at least in part on a difference between the first result and the second result.

2. The method of claim 1, wherein retrieving the second result includes instructing, with the program, a second computer device of the controller to perform the test operation.

3. The method of claim 1, wherein retrieving the second result includes reading a pre-generated second result stored in a test result memory.

4. The method of claim 1, wherein comparing the first result with the second result is further based on a functional correctness of the first computer device.

5. The method of claim 1, wherein selecting the test operation further includes selecting a write operation and a read operation as the test operation in response to the operational component being a memory component.

6. The method of claim 1, wherein selecting the test operation further includes selecting a bit shift operation as the test operation in response to the operational component being a register.

7. The method of claim 1, wherein selecting the test operation further includes selecting one of a vector addition operation, a vector multiplication operation, or a logic operation in response to the operational component being an Arithmetic Logic Unit (ALU).

8. The method of claim 1, further comprising selecting an invocation control that indicates execution timing for the test operation.

9. The method of claim 8, wherein selecting the invocation control includes selecting one of an immediate execution, a periodic execution, or an idle cycle execution.

10. A method of testing a first computer device of a controller of a vehicle, the method comprising:
- selecting, at a program running in an operating system in the controller, an operational component of the first computer device that is not individually addressable by the operating system, wherein the operational component is one of a memory component, a register, and an Arithmetic Logic Unit (ALU);
- selecting, with the program, a test operation that is configured to utilize an entire capacity of the operational component without directly addressing the operational component by the operating system, wherein selecting the test operation includes:
  - selecting a write operation and a read operation as the test operation in response to the operational component being the memory component,
  - selecting a bit shift operation as the test operation in response to the operational component being the register,
  - selecting one of a vector addition operation, a vector multiplication operation, or a logic operation in response to the operational component being the ALU;
- instructing the first computer device by individually addressing the first computer device to perform the test operation and to generate a first result while the operating system is executing on the controller;
- instructing a second computer device of the vehicle to perform the test operation and generate a second result;
- comparing the first result of the test operation from the first computer device with the second result based on a functional correctness of the first computer device; and
- indicating that the first computer device is faulty based at least in part on a difference between the first result and the second result.

11. The method of claim 10, further comprising selecting an invocation control that indicates execution timing for the test operation.

12. The method of claim 11, wherein selecting the invocation control includes selecting one of an immediate execution, a periodic execution, or an idle cycle execution.

13. A system for testing a computer device of a vehicle, the system comprising:
- a controller having a first computer device with an operational component, the controller programmed for:
  - selecting, with a program running in an operating system in the controller, the operational component of the first computer device that is not individually addressable by the operating system;
  - selecting, with the program, a test operation that is configured to utilize an entire capacity of the operational component without directly addressing the operational component by the operating system;
  - instructing the first computer device by individually addressing the first computer device to perform the test operation and to generate a first result while the operating system is executing on the controller;
  - retrieving a second result of the test operation;
  - comparing the first result of the test operation from the first computer device with the second result; and
  - indicating that the first computer device is faulty based at least in part on a difference between the first result and the second result.

14. The system of claim 13, wherein retrieving the second result includes instructing, with the program, a second computer device of the vehicle to perform the test operation.

15. The system of claim 13, wherein retrieving the second result includes reading a pre-generated second result stored in a test result memory.

16. The system of claim 13, wherein comparing the first result with the second result is further based on a functional correctness of the first computer device.

17. The system of claim 13, wherein selecting the test operation further includes selecting a write operation and a read operation as the test operation in response to the operational component being a memory component.

18. The system of claim 13, wherein selecting the test operation further includes selecting a bit shift operation as the test operation in response to the operational component being a register.

19. The system of claim 13, wherein selecting the test operation further includes selecting one of a vector addition operation, a vector multiplication operation, or a logic operation in response to the operational component being an Arithmetic Logic Unit (ALU).

20. The system of claim 13, further comprising selecting an invocation control that indicates execution timing as one of an immediate execution, a periodic execution, or an idle cycle execution.

* * * * *